UNITED STATES PATENT OFFICE.

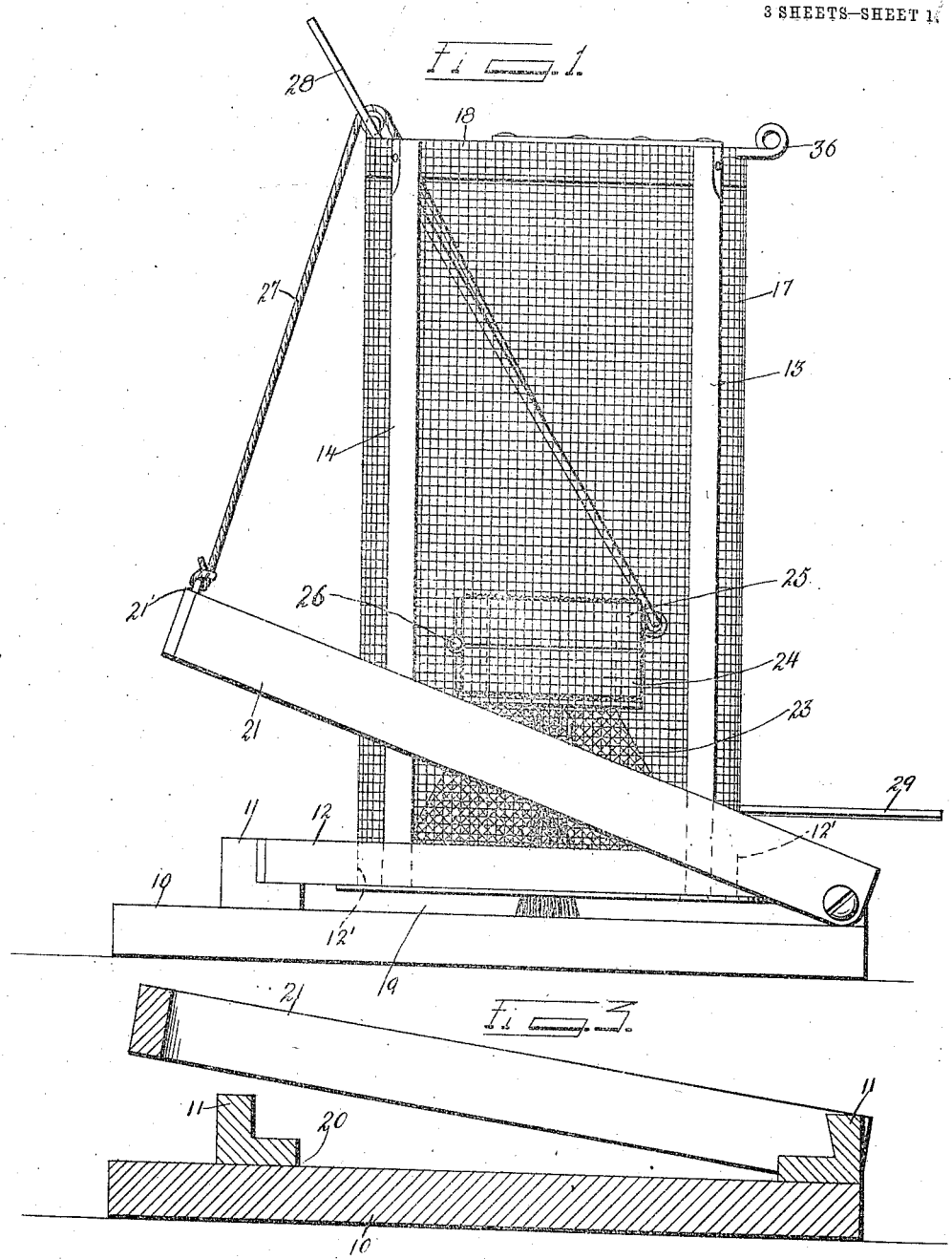

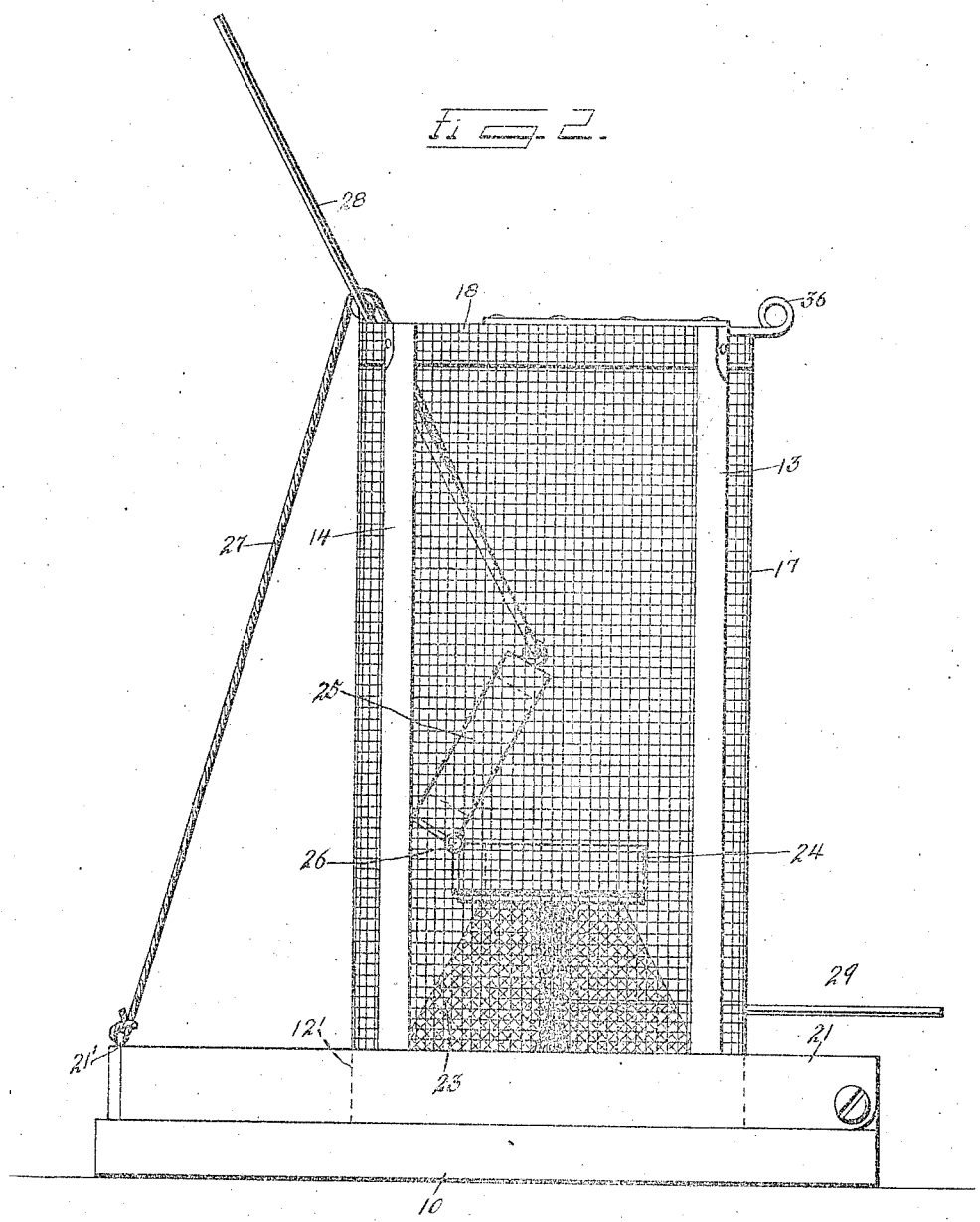

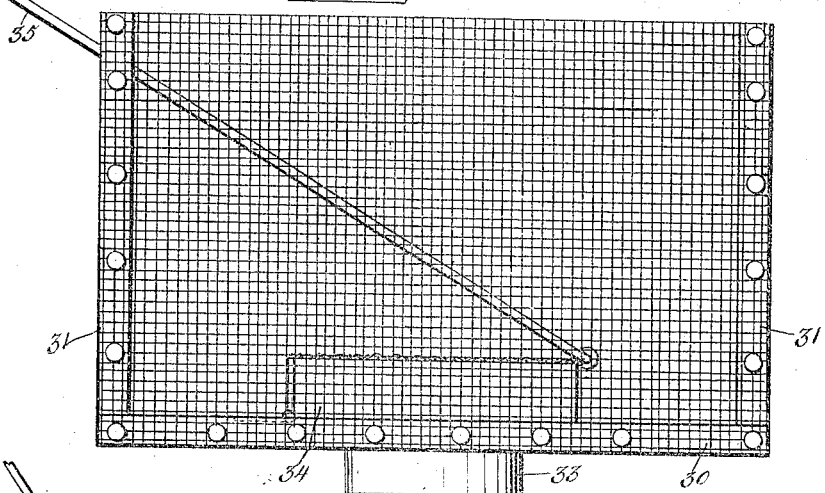
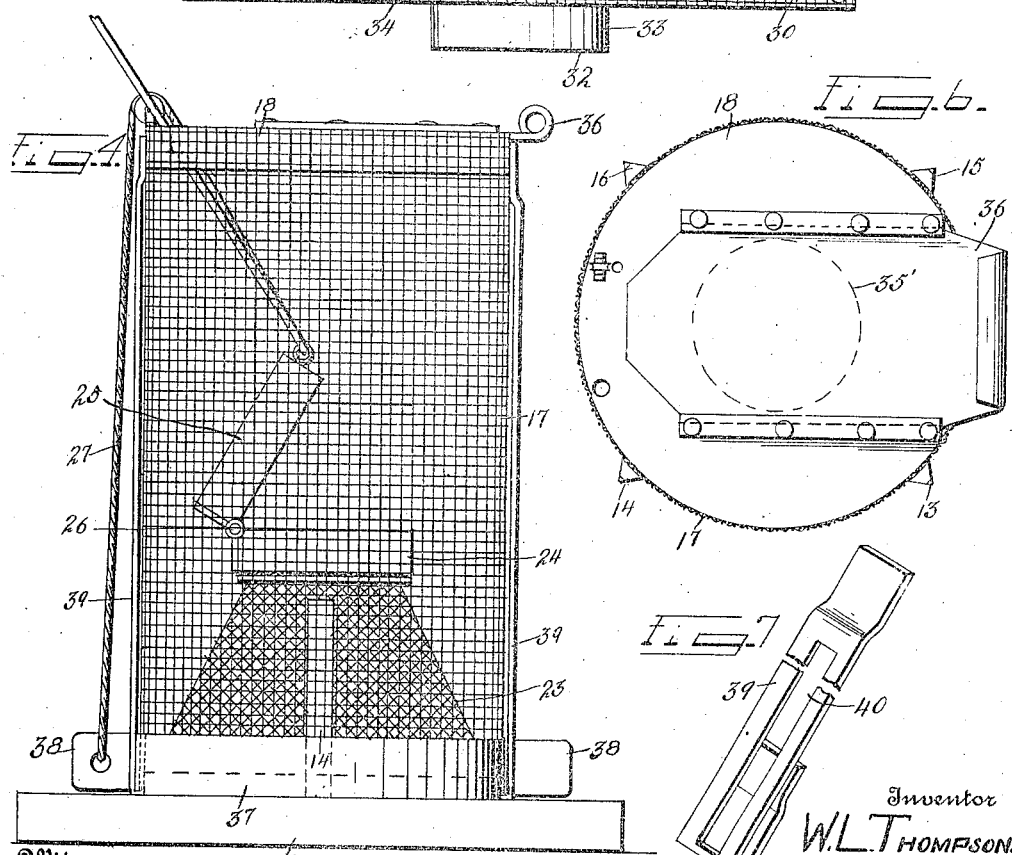

WILLIAM L. THOMPSON, OF HIGHMORE, SOUTH DAKOTA.

INSECT-TRAP.

1,013,699.

Specification of Letters Patent.

Patented Jan. 2, 1912.

Application filed February 1, 1911. Serial No. 605,925.

*To all whom it may concern:*

Be it known that I, WILLIAM L. THOMPSON, a citizen of the United States, residing at Highmore, in the county of Hyde, State of South Dakota, have invented certain new and useful Improvements in Insect-Traps; and I do hereby declare the following to be a full, clear, and exact description of the invention, such as will enable others skilled in the art to which it appertains to make and use the same.

This invention relates to an improvement in fly traps.

The primary object is to provide a device of this character which will be efficient in practice, simple in construction and economical to manufacture.

With the above and other objects in view the invention consists in certain constructions, combinations and arrangements of parts, clearly described in the following specification and clearly illustrated in the accompanying drawings.

In the drawings:—Figure 1 is a side elevation of the device, the trap being in an open position. Fig. 2 is a similar view the fly entrance being closed, the inner valve or gate being shown in its open position. Fig. 3 is a detail sectional view the cylindrical casing being removed. Fig. 4 is a view showing the cylindrical member provided with a modified form of closure. Fig. 5 is a side elevation of a box which may be utilized to remove the flies from the trap. Fig. 6 is a top plan view of the cylinder. Fig. 7 is a detail view of one of the guides shown in the modified form.

In the drawings, 10 designates a base member on which is positioned spaced supports 11. A supporting plate 12 rests on said supports, said plate 12 being provided with the central circular aperture 12'. Arranged at equi-distant points adjacent the edge of said circular aperture and extending upwardly therefrom are supporting members 13, 14, 15 and 16 which support the cylinder 17 formed of wire mesh, a circular plate 18 forming a closure for said cylinder, said plate being supported by the end portions of the supports. The supporting plate 12 is spaced from the base 10 by the supports 11, said supports extending transversely across the base forming openings 19 and 20 beneath the plate 12 which may be closed by means of a yoke 21 which is pivotally supported by one of the supports 11.

The cylinder 17 has its lower end portion secured to the surrounding wall of the aperture 12' and a conical member 23 of wire mesh is placed within the cylinder and has its lower end also secured to said plate within the opening, while positioned on the top of the conical member 23 is an annular member 24 adapted to form a seat for a valve or gate 25, said annular member and said gate being hingedly connected at the point 26. A cable 27 is secured to said gate, said cable extending through the plate 18 over the pulley 18' arranged on said plate, said cable being connected to the bar 21' of the yoke 21, the cable being of such length that the gate will be in an open position when the yoke 21 has been swung on its pivot to close the entrances to the cylinder. It will thus be noted that the gate is opened to its full extent as soon as the entrance to the cylinder is closed. A rod 28 is connected to said gate, said rod extending through the plate 18. It will be seen that by forcing this rod within the cylinder the gate will be closed and the yoke swung on its pivot by means of the cable 27.

The trap is shown in set position in Fig. 1 a suitable bait being placed on the support beneath the conical member. The flies enter beneath the supporting plate and after a sufficient number have entered, the yoke is forced down closing the entrance for the flies and opening the valve or gate. A suitable device such as the rod 29 is positioned within the conical member, said rod being provided with means which when the rod is reciprocated drives the flies through the opening in the conical member to the upper portion of the cylinder. After the flies have entered the cylinder the trap may be placed on the stove or in an oven and the flies destroyed. When the trap is too large to be conveniently placed in an oven the box shown in Fig. 5 is utilized said box being substantially rectangular and provided with the solid base portion 30 and the end walls 31, the base portion 30 being formed with a central circular aperture 32 from which extends a flange 33 said aperture being closed by the hingedly supported gate member 34 which is opened and closed through the medium of the rod 35 which extends through one of the end portions 31. In removing the flies from the cylinder the rectangular box is positioned on the plate 18 the flange 33 extending within an aperture 35' formed in said plate, said aperture being normally closed by means of a slide 36. The flies will enter the box when the gate member 34 is in its open position. After the same have entered the box said gate member is closed and the box is removed from the cylinder, the box may then be placed in the oven to destroy the flies. Attention is called to the fact that the gate which is positioned within the cylinder is formed of an annular member which is covered with wire mesh, said wire mesh being formed at points adjacent the annular member with apertures so formed as to permit of the entrance of a fly yet preventing the return of said fly, thus permitting the insects to pass through to the cylinder even when the gate is closed.

In the form shown in Fig. 4 the supporting plate is dispensed with and the cylinder supported by the end portions of the members 13, 14, 15 and 16 the cylinder being spaced from the base 10. An annular band 37 is slidably arranged on the cylinder and adapted to close the space between the base 10 and the end portion of said cylinder, said band being provided with extensions 38 which enter guides 39, said guides being provided with elongated slots 40 which receive said extensions. The guides are formed of metal, their end portions being bent to extend within the cylinder, the guides extending beyond the cylinder and assisting in the support of the same. In this form the cable 28 is secured to one of the offsets, said cable being adapted to move the band on the cylinder to close the opening beneath the same in the same manner as in the preferred form, the yoke being the equivalent of the band.

The many advantages of a trap constructed in this manner will be clearly apparent as it will be seen that the insects may be conveniently removed from the trap.

I claim:—

1. A fly trap consisting of a supporting base, supports transversely arranged on said base, a plate mounted on said supports, said plate being spaced from said base, a yoke pivotally connected to one of said supports, a cylinder formed of wire mesh, said cylinder being embraced by the edge portion of a centrally arranged opening formed in said plate, the lower end of said cylinder being secured to said plate, a conical extension within the cylinder and also secured to said plate, an annular member mounted at the mouth of said extension, a second annular member hingedly connected to the first mentioned member, said second member being covered with wire mesh, a cable secured to said second member, said cable passing through a plate adapted to form a closure for the upper end of said cylinder, the end portion of said cables being connected to said yoke, and a rod extending through said plate, said rod being connected to said second member to swing the same on its pivot.

2. A fly trap consisting of a base, a supporting plate spaced from said base, a pivotally supported yoke, a cylinder formed of wire mesh, the lower portion of said cylinder being arranged within an opening formed in said plate, a cone also arranged within the opening and extended within the cylinder, an annular member arranged on said extension, a closure pivotally connected to said annular member, and means for opening said closure as said yoke is swung on its pivot.

In testimony whereof, I affix my signature, in presence of two witnesses.

WILLIAM L. THOMPSON.

Witnesses:
 M. C. CUNNINGHAM,
 M. G. TRAVER.